United States Patent Office.

JOHN FALE, OF HAWKINSVILLE, GEORGIA.

COLLYRIUM.

SPECIFICATION forming part of Letters Patent No. 266,797, dated October 31, 1882.

Application filed September 21, 1882. (No specimens.)

*To all whom it may concern:*

Be it known that I, JOHN FALE, a citizen of the United States, residing at Hawkinsville, in the county of Pulaski and State of Georgia, have invented certain new and useful Improvements in Eye-Water; and I do hereby declare that the following is a full, clear, and exact description of the same.

This invention relates to certain new and useful improvements in eye-waters; and it consists in the combination of muriate of berberina, pulverized camphor, and camphor-water, in the proportions hereinafter named.

In the preparation of this eye-water I take muriate of berberina in the proportions of four grains to two grains of pulverized camphor, and to these add one fluid ounce of camphor-water. The combination of muriate of berberina with pulverized camphor and camphor-water forms simply a precipitated solution of muriate of berberina and camphor, having a specific action on inflamed surfaces, as it contains tonic and anti-periodic properties of a high order.

It is true that muriate of berberina can be used in combination with chloride of sodium and blown through a quill or tube into the eye; but it will be readily seen that the combination according to the formula above described can be more conveniently and gently used, while at the same time it contains the stimulating properties of camphor, acting specifically on granulated eyelids, and also, in simple opthalmia, on the conjunctiva and capillary organs of the eye.

While it is intended preferably to put up the ingredients according to the above formula, still, for convenience, the muriate of berberina and the pulverized camphor may be put up in the form of a powder, and the camphor-water added when the compound is desired for use.

When using the above-described preparation the eyes should be first bathed in warm water, and the mixture then applied with a soft mop, made of old cotton cloth, several times a day, allowing a portion of said mixture to go into the eye each time.

I am aware that camphor-water has been used as a vehicle for medicine to be applied to the eyes, and therefore do not claim broadly its use.

Having now fully described my invention, what I claim as new, and desire to secure by Letters Patent, is—

An eye-water composed of muriate of berberina, pulverized camphor, and camphor-water, in substantially the proportions named.

In testimony that I claim the above I have hereunto subscribed my name in the presence of two witnesses.

JOHN FALE.

Witnesses:
   D. C. JOINER,
   CHAS. RODEN.